(12) United States Patent
Barral et al.

(10) Patent No.: US 7,868,758 B2
(45) Date of Patent: Jan. 11, 2011

(54) PASSENGER SCREENING SYSTEM AND METHOD

(75) Inventors: Geoffrey Alden Barral, San Diego, CA (US); Alexander Robert Perry, San Diego, CA (US); Douglas Anthony Taussig, San Diego, CA (US)

(73) Assignee: Morpho Detection, Inc., Newark, CA (US)

( * ) Notice: Subject to any disclaimer, the term of this patent is extended or adjusted under 35 U.S.C. 154(b) by 483 days.

(21) Appl. No.: 11/684,332

(22) Filed: Mar. 9, 2007

(65) Prior Publication Data

US 2008/0036592 A1 Feb. 14, 2008

Related U.S. Application Data

(60) Provisional application No. 60/781,057, filed on Mar. 10, 2006.

(51) Int. Cl.
G08B 13/24 (2006.01)
(52) U.S. Cl. ........................................ 340/551; 324/244
(58) Field of Classification Search .................. 324/301, 324/313, 345, 346, 377, 200, 228, 244, 263, 324/260; 378/57, 51, 53, 64, 70, 82, 83, 378/86, 90; 340/10.1, 10.2, 572.1, 572.4, 340/572.7, 933, 941, 550–552, 562, 572.6, 340/573.1; 109/2, 9, 21, 58
See application file for complete search history.

(56) References Cited

U.S. PATENT DOCUMENTS

| 3,758,849 | A | * | 9/1973 | Susman et al. ............... 324/225 |
| 3,971,983 | A | * | 7/1976 | Jaquet ......................... 324/227 |
| 3,986,104 | A | * | 10/1976 | Randolph, Jr. .............. 324/327 |
| 4,137,567 | A | | 1/1979 | Grube |
| 4,166,972 | A | * | 9/1979 | King et al. ................... 324/310 |
| 4,818,854 | A | | 4/1989 | Davies et al. |
| 4,821,118 | A | | 4/1989 | Lafreniere |
| 5,039,981 | A | * | 8/1991 | Rodriguez ................... 340/551 |
| 5,183,008 | A | | 2/1993 | Carrano |
| 5,345,809 | A | * | 9/1994 | Corrigan et al. .............. 73/23.2 |
| 5,500,591 | A | * | 3/1996 | Smith et al. .................. 324/307 |
| 5,521,583 | A | * | 5/1996 | Frahm et al. ................. 340/551 |
| 5,592,083 | A | | 1/1997 | Magnuson |

(Continued)

FOREIGN PATENT DOCUMENTS

DE 2934966 A1 3/1981

(Continued)

OTHER PUBLICATIONS

International Search Report of PCT/US2007/064297 dated Apr. 8, 2008, 6 pages.

(Continued)

*Primary Examiner*—Daniel Wu
*Assistant Examiner*—Rufus Point
(74) *Attorney, Agent, or Firm*—Armstrong Teasdale LLP

(57) ABSTRACT

A passenger screening system including a first gradiometer, and a second gradiometer disposed adjacent the first gradiometer. The first and second gradiometers are each configured to operate at a first frequency and a second frequency to facilitate detecting the presence of an explosive material. A method of operating the passenger screening system is also described herein.

20 Claims, 7 Drawing Sheets

U.S. PATENT DOCUMENTS

| | | | |
|---|---|---|---|
| 5,600,303 A | 2/1997 | Husseiny et al. | |
| 5,600,941 A * | 2/1997 | Strosser | 56/10.2 J |
| 6,003,009 A | 12/1999 | Nishimura | |
| 6,044,353 A * | 3/2000 | Pugliese, III | 705/5 |
| 6,119,096 A | 9/2000 | Mann et al. | |
| 6,137,895 A | 10/2000 | Al-Sheikh | |
| 6,158,658 A | 12/2000 | Barclay | |
| 6,268,724 B1 | 7/2001 | Crowley | |
| 6,335,688 B1 | 1/2002 | Sweatte | |
| 6,340,814 B1 | 1/2002 | Vandermey | |
| 6,362,739 B1 * | 3/2002 | Burton | 340/572.6 |
| 6,392,408 B1 * | 5/2002 | Barrall et al. | 324/300 |
| 6,501,414 B2 * | 12/2002 | Arndt et al. | 342/22 |
| 6,507,278 B1 | 1/2003 | Brunetti et al. | |
| 6,522,135 B2 | 2/2003 | Miller et al. | |
| 6,570,580 B1 | 5/2003 | Suzuki et al. | |
| 6,610,977 B2 | 8/2003 | Megerle | |
| 6,791,329 B2 * | 9/2004 | Nelson | 324/329 |
| 6,847,208 B1 | 1/2005 | Crowley et al. | |
| 6,914,668 B2 | 7/2005 | Brestel et al. | |
| 6,922,460 B2 | 7/2005 | Skatter et al. | |
| 6,952,163 B2 | 10/2005 | Huey et al. | |
| 6,956,476 B2 | 10/2005 | Buess et al. | |
| 6,970,087 B2 * | 11/2005 | Stis | 340/551 |
| 7,047,829 B2 | 5/2006 | Napoli | |
| 7,053,785 B2 * | 5/2006 | Akins | 340/693.9 |
| 7,098,789 B2 * | 8/2006 | Manneschi | 340/551 |
| 7,110,925 B2 | 9/2006 | Pendergraft et al. | |
| 7,118,027 B2 | 10/2006 | Sussman | |
| 7,132,942 B1 | 11/2006 | Buess et al. | |
| 7,136,513 B2 | 11/2006 | Waehner et al. | |
| 7,148,684 B2 | 12/2006 | Laubacher et al. | |
| 7,193,515 B1 | 3/2007 | Roberts et al. | |
| 7,253,727 B2 | 8/2007 | Jenkins | |
| 7,295,019 B2 * | 11/2007 | Yang et al. | 324/663 |
| 7,317,390 B2 | 1/2008 | Huey et al. | |
| 7,355,401 B2 * | 4/2008 | Laubacher et al. | 324/300 |
| 7,365,536 B2 | 4/2008 | Crowley et al. | |
| 7,414,404 B2 * | 8/2008 | Keene | 324/329 |
| 7,636,036 B2 * | 12/2009 | Manneschi | 340/454 |
| 2003/0080744 A1 * | 5/2003 | Goldfine et al. | 324/345 |
| 2003/0171939 A1 | 9/2003 | Yagesh et al. | |
| 2004/0059953 A1 | 3/2004 | Purnell | |
| 2004/0117638 A1 | 6/2004 | Monroe | |
| 2004/0191757 A1 | 9/2004 | Murphy et al. | |
| 2004/0222790 A1 | 11/2004 | Karmi et al. | |
| 2004/0236950 A1 | 11/2004 | Carte | |
| 2004/0239325 A1 * | 12/2004 | Hardy et al. | 324/318 |
| 2005/0019220 A1 | 1/2005 | Napoli | |
| 2005/0024199 A1 | 2/2005 | Huey et al. | |
| 2005/0030029 A1 | 2/2005 | Sauer et al. | |
| 2005/0057354 A1 | 3/2005 | Jenkins et al. | |
| 2005/0110672 A1 | 5/2005 | Cardiasmenos et al. | |
| 2005/0256724 A1 | 11/2005 | Rasin et al. | |
| 2006/0087439 A1 | 4/2006 | Tolliver | |
| 2006/0232274 A1 | 10/2006 | Shilstone et al. | |
| 2006/0255798 A1 * | 11/2006 | Crowley et al. | 324/300 |
| 2007/0222620 A1 | 9/2007 | Trammell, III | |
| 2008/0129292 A1 * | 6/2008 | Leussler et al. | 324/318 |

FOREIGN PATENT DOCUMENTS

| | | |
|---|---|---|
| WO | 9221987 | 12/1992 |
| WO | 0028492 | 5/2000 |
| WO | 2004111963 | 12/2004 |
| WO | 2007089775 A2 | 8/2007 |

OTHER PUBLICATIONS

Office Action dated Mar. 17, 2008, U.S. Appl. No. 11/385,936, 8 pages.
Final Office Action dated Oct. 2, 2008, U.S. Appl. No. 11/385,936, 9 pages.
Office Action dated Apr. 7, 2009, U.S. Appl. No. 11/385,936, 7 pages.
Final Office Action dated Dec. 30, 2009, U.S. Appl. No. 11/456,742.
Office Action dated Jun. 8, 2009, U.S. Appl. No. 11/456,742.
Advisory Action dated Apr. 7, 2009, U.S. Appl. No. 11/456,742.
Final Office Action dated Dec. 18, 2008, U.S. Appl. No. 11/456,742.
Office Action dated May 12, 2008, U.S. Appl. No. 11/456,742.
Advisory Action dated May 28, 2010, U.S. Appl. No. 11/385,231.
Final Office Action dated Mar. 5, 2010, U.S. Appl. No. 11/385,231.
Office Action dated Sep. 3, 2009 U.S. Appl. No. 11/385,231.
PCT/US2007/005154 International Search Report dated Oct. 3, 2006.

* cited by examiner

PASSENGER SCREENING SYSTEM AND METHOD

CROSS REFERENCE TO RELATED APPLICATIONS

This application is entitled to the benefit of, and claims priority to, provisional U.S. Patent Application Ser. No. 60/781,057 filed on Mar. 10, 2006, and entitled "Integrated Verification and Screening Kiosk System", which is hereby incorporated by reference in its entirety.

BACKGROUND OF THE INVENTION

This invention relates generally to personnel screening systems utilized at passenger terminals, and more particularly, to an integrated passenger screening system.

The Transportation Security Administration (TSA) has recently mandated more stringent inspection procedures be implemented by the travel industry to reduce the possibility of passengers boarding a carrier such as a plane, for example, carrying concealed weapons, explosives, or other contraband. To facilitate preventing passengers boarding a plane carrying concealed weapons, explosives, etc., the TSA requires that all passengers be screened prior to boarding the aircraft.

For example, passengers arriving at the airport terminal first submit to a manual verification process that generally includes presenting their boarding pass and a form of identification such as a driver's license or passport, for example, to security personnel. The security personnel then manually verify that the passenger has a valid boarding pass, the name on the identification corresponds to the name on the boarding pass, and that the picture on the license or passport corresponds to the passenger presenting the license and boarding pass to the security personnel.

After the manual verification process is completed, the passenger is requested to walk through a metal detector to ensure that the passenger is not carrying any concealed weapons. While the metal detector is reasonably effective at detecting specific quantities of metal, the metal detector is less effective at determining whether the shoes contain any explosive material. As such, security personnel frequently request that passengers remove their shoes and place their shoes into the baggage screening system such that security personnel can visually determine whether the shoes may conceal any explosive material or devices. As a result, the known metal detection system is time-consuming for the passengers, and does not effectively screen the shoes for explosive devices that may be hidden in the shoes or near the ankle/calf region of the passenger.

BRIEF DESCRIPTION OF THE INVENTION

In one aspect, a passenger screening system is provided. The passenger screening system includes a first gradiometer, and a second gradiometer disposed adjacent the first gradiometer. The first and second gradiometers each configured to operate at a first frequency and a second frequency to facilitate detecting the presence of an explosive material.

In another aspect, a method for operating a passenger screening system is provided. The method includes operating a first gradiometer to detect the presence of an explosive material in a first shoe, and operating a second gradiometer to detect the presence of an explosive material in a second shoe, wherein the first and second gradiometers are each configured to operate at a first frequency and a second frequency to facilitate detecting the presence of the explosive material.

DETAILED DESCRIPTION OF THE INVENTION

Figure 1:
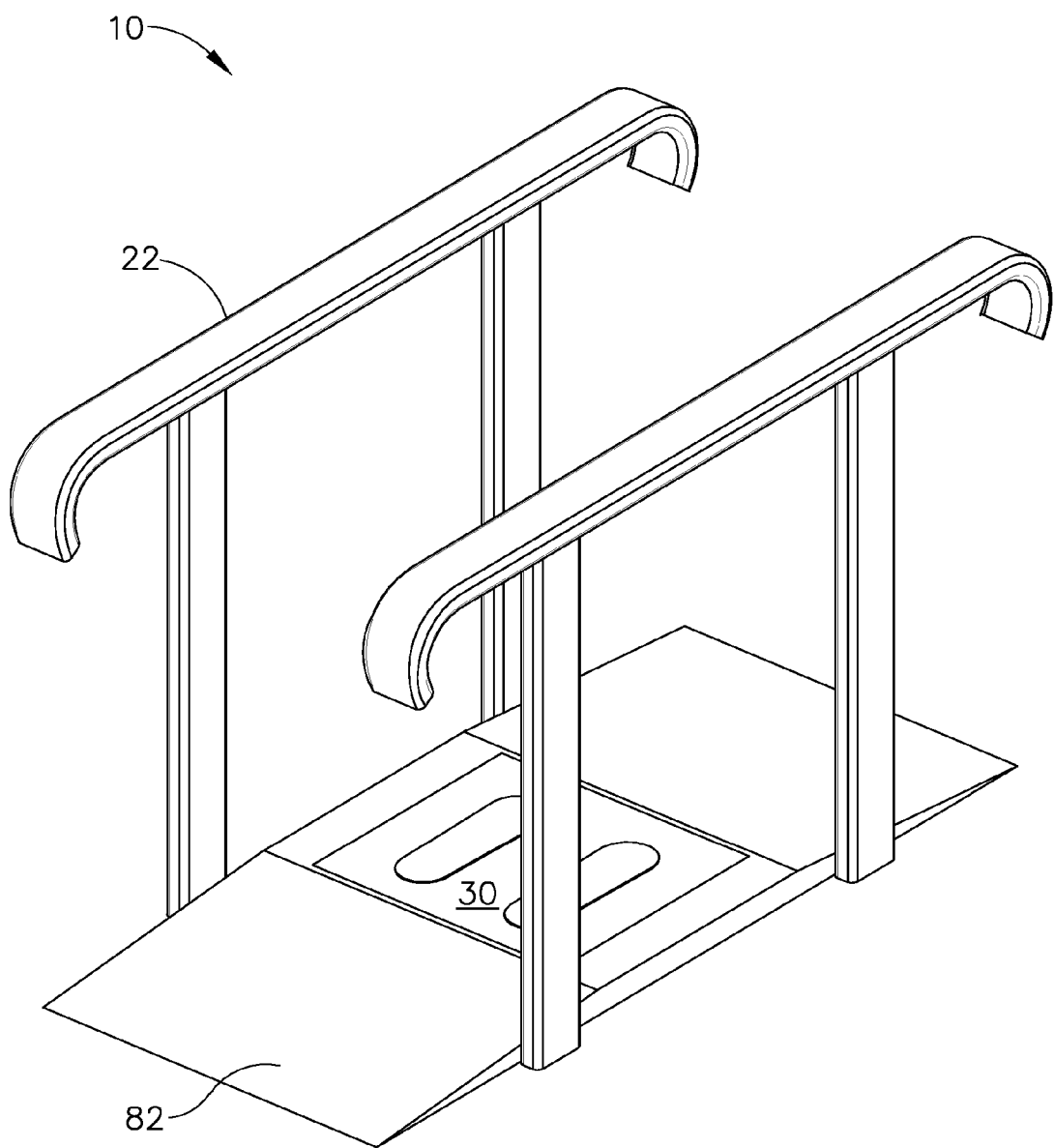
FIG. 1 is a perspective view of an exemplary screening system.
Figure 2:
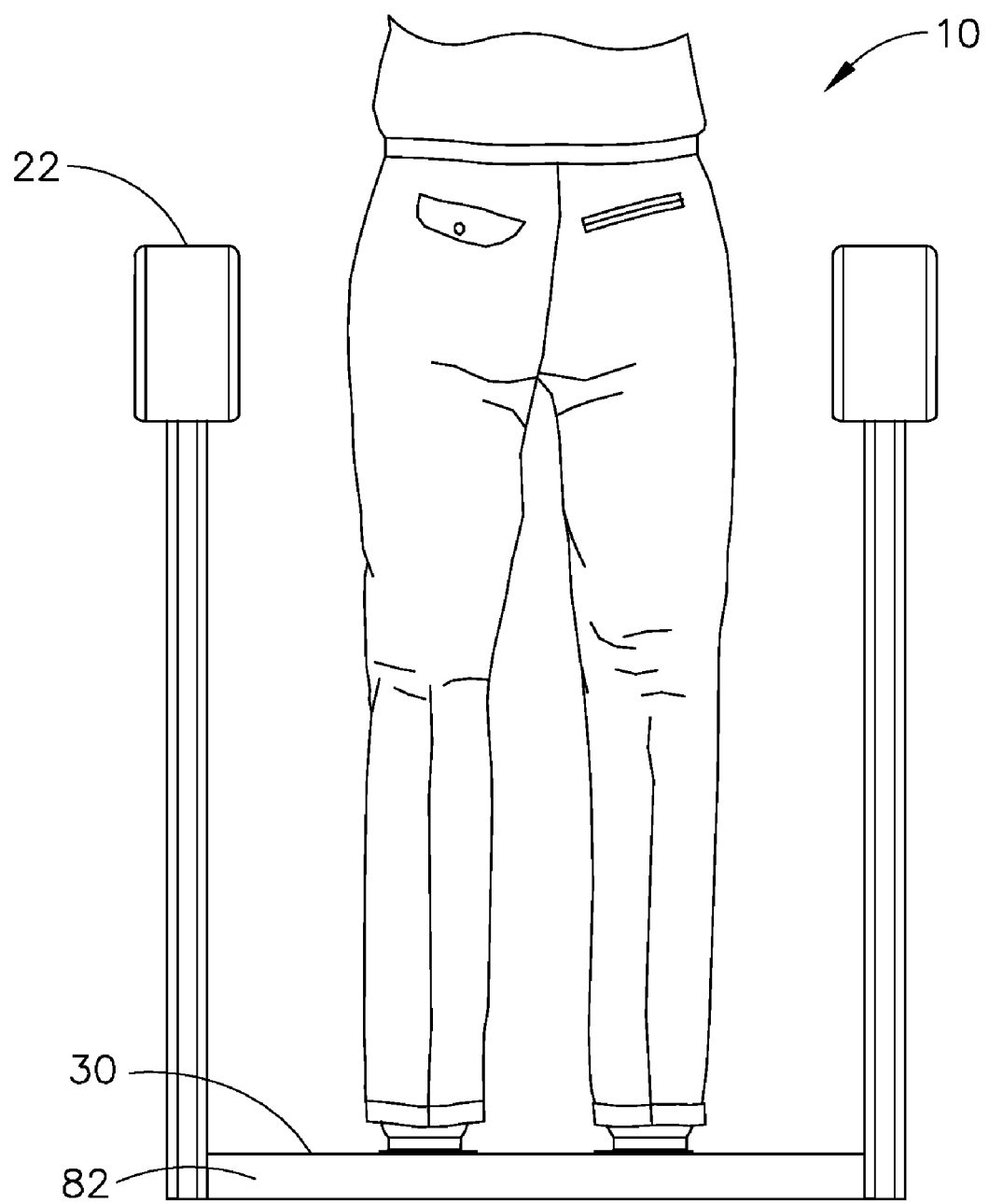
FIG. 2 is a second perspective view of the screening system shown in FIG. 1.
Figure 3:
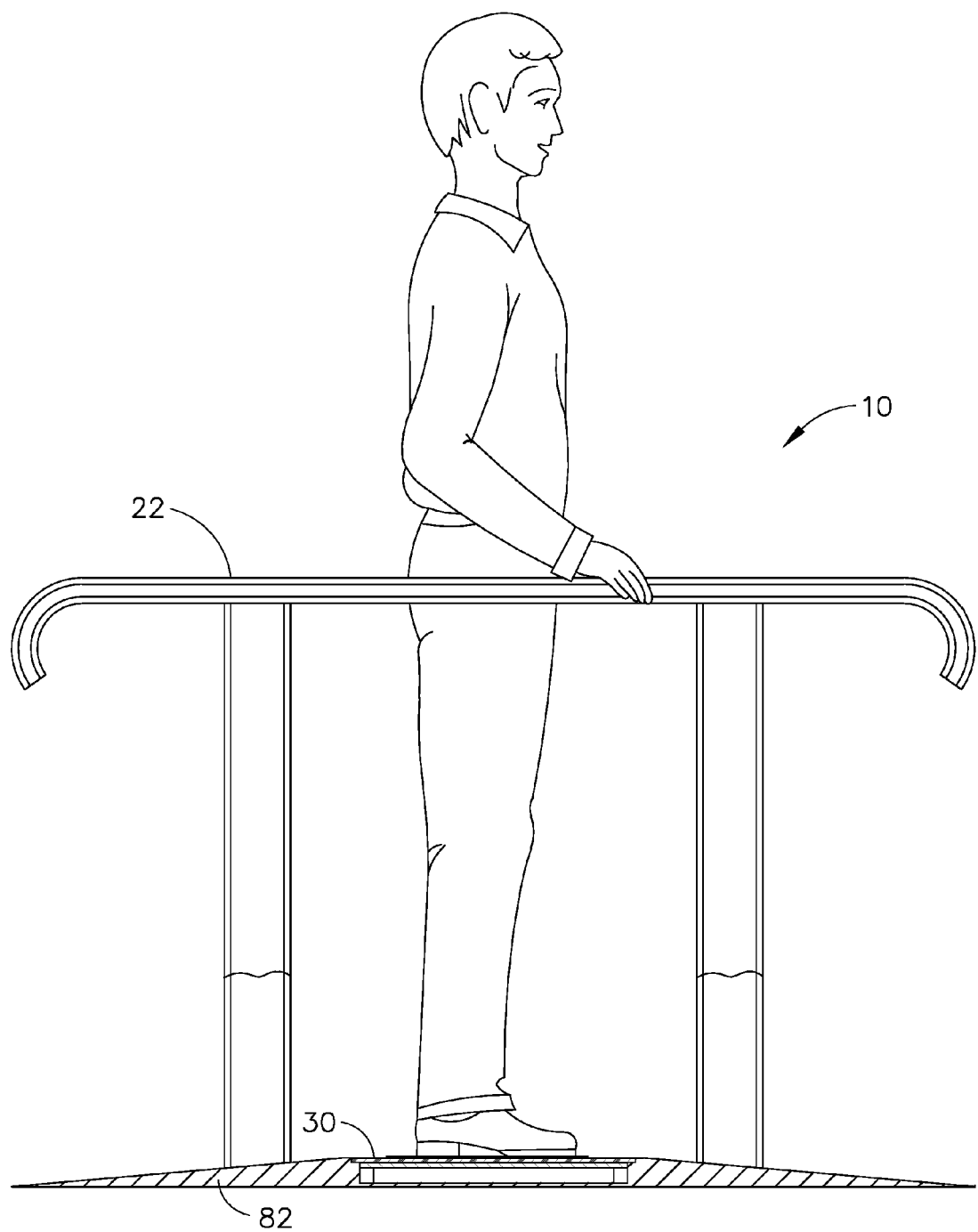
FIG. 3 is a side section view of the screening system shown in FIG. 1.
Figure 4:
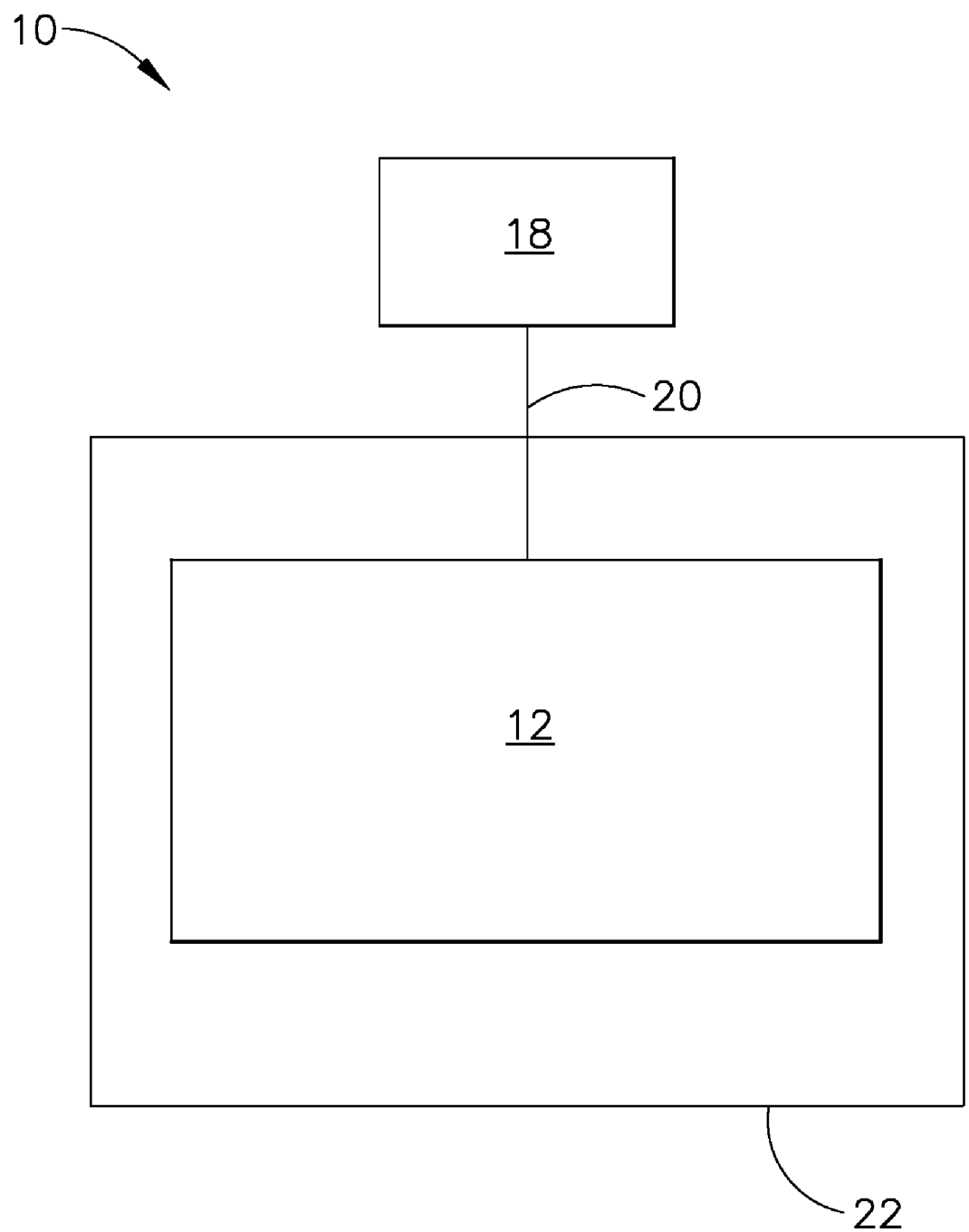
FIG. 4 is a simplified block diagram of the screening system shown in FIGS. 1-3.

FIG. 1 is a perspective view of an exemplary passenger screening system 10, FIG. 2 is a second perspective view of the passenger screening system shown in FIG. 1, FIG. 3 is a side section view of the passenger screening system 10 shown in FIG. 1, and FIG. 4 is a simplified block diagram of the passenger screening system 10. In the exemplary embodiment, system 10 includes at least one imaging modality 12. Modality 12 is configured to detect the presence of explosive materials that may be concealed in a passengers shoes or proximate to the lower extremities of the passengers legs, for example. System 10 also includes at least one computer 18, and a communications bus 20 that is coupled between modality 12 and computer 18 to enable operator commands to be sent to at least one of modality 12 and to allow outputs generated by modality 12 to be delivered to computer 18 and thus utilized by computer 18 for data analysis or utilized by an operator of computer 18. In one embodiment, modality 12 is hardwired to computer 18. In another embodiment, communications bus 20 is a local area network. Optionally, communications bus 20 includes an internet connection.

As shown in FIG. 4, modality 12 and computer 18 are integrated into a single screening system 10. In the exemplary embodiment, modality 12, and computer 18 are each housed within a screening system 10. Optionally, computer 18 is housed remotely from screening system 10 and electrically coupled to modality 12 utilizing bus 20. In the exemplary embodiment, screening system 10 includes a floor 30 that, in one exemplary embodiment, facilitates concealing at least a portion of modality 12 and provides a structural platform over the portion of modality 12 to facilitate scanning the passenger. Moreover, screening system 10 may include a pair of handrails to facilitate guiding the passenger through the screening process. Optionally, screening system 10 may include a pair of sidewalls (not shown) such that the passenger may enter screening system 10 through a first opening, traverse through screening system 10, and exit screening system 10 through a second opening.

In the exemplary embodiment, shown in FIGS. 1-3, modality 12 may be implemented utilizing a quadrupole resonance (QR) detection system 60 that utilizes quadrupole resonance to detect explosives such as, but not limited to C4, Semtex, Detasheet, TNT, ANFO, and/or HMX since the quadrupole resonance signature of these explosives is unique and measurable in seconds.

Nuclear Quadrupole Resonance (NQR) is a branch of radio frequency spectroscopy that exploits the inherent electrical properties of atomic nuclei and may therefore be utilized to detect a wide variety of potentially explosive materials. For example, nuclei having non-spherical electric charge distributions possess electric quadrupole moments. Quadrupole resonance arises from the interaction of the nuclear quadrupole moment of the nucleus with the local applied electrical field gradients produced by the surrounding atomic environment. Any chemical element's nucleus which has a spin quantum number greater than one half can exhibit quadrupole resonance. Such quadrupolar nuclei include: $^{7}Li$, $^{9}Be$, $^{14}N$, $^{17}O$, $^{23}Na$, $^{27}Al$, $^{35}Cl$, $^{39}Cl$, $^{39}K$, $^{55}Mn$, $^{75}As$, $^{79}Br$, $^{81}Br$, $^{127}I$, $^{197}Au$, and $^{209}Bi$. Many substances containing such nuclei, approximately 10,000, have been identified that exhibit quadrupole resonance.

It so happens that some of these quadrupolar nuclei are present in explosive and narcotic materials, among them being $^{14}N$, $^{17}O$, $^{23}Na$, $^{35}Cl$, $^{37}Cl$, and $^{39}K$. The most studied quadrupolar nucleus for explosives and narcotics detection is nitrogen. In solid materials, electrons and atomic nuclei produce electric field gradients. These gradients modify the energy levels of any quadrupolar nuclei, and hence their characteristic transition frequencies. Measurements of these frequencies or relaxation time constants, or both, can indicate not only which nuclei are present but also their chemical environment, or, equivalently, the chemical substance of which they are part.

When an atomic quadrupolar nucleus is within an electric field gradient, variations in the local field associated with the field gradient affect different parts of the nucleus in different ways. The combined forces of these fields cause the quadrupole to experience a torque, which causes it to precess about the electric field gradient. Precessional motion generates an oscillating nuclear magnetic moment. An externally applied radio frequency (RF) magnetic field in phase with the quadrupole's precessional frequency can tip the orientation of the nucleus momentarily. The energy levels are briefly not in equilibrium, and immediately begin to return to equilibrium. As the nuclei return, they produce an RF signal, known as the free induction decay (FID). A pick-up coil detects the signal, which is subsequently amplified by a sensitive receiver to measure its characteristics.

Figure 5:
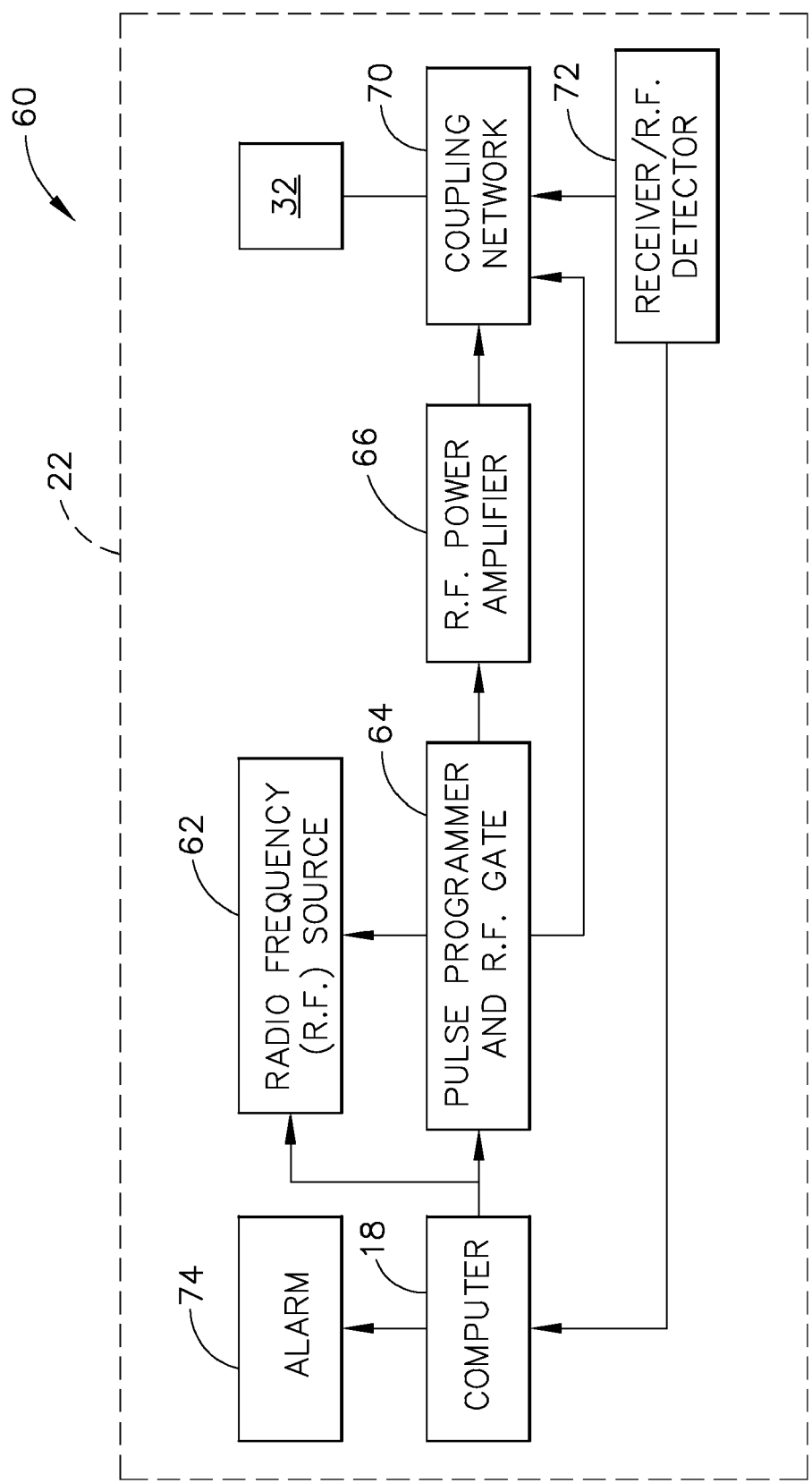
FIG. 5 is a schematic illustration of an exemplary Quadrupole Resonance (QR) system that may be utilized with the screening shown in FIGS. 1-4.

FIG. 5 is a simplified schematic illustration of an exemplary quadrupole resonance system 60 that may be utilized to implement modality 12. Quadrupole resonance system 60 may include a radio frequency source 62, a pulse programmer and RF gate 64 and an RF power amplifier 66 that are configured to generate a plurality of radio frequency pulses having a predetermined frequency to be applied to a coil such as sensor 32. A communications network 70 conveys the radio frequency pulses from radio frequency source 62, pulse programmer and RF gate 64 and RF power amplifier 66 to sensor 32 that, in the exemplary embodiment, is positioned within screening system 10. The communications network 70 also conducts the signal to a receiver/RF detector 72 from sensor 32 after the passenger is irradiated with the radio frequency pulses.

Figure 6:
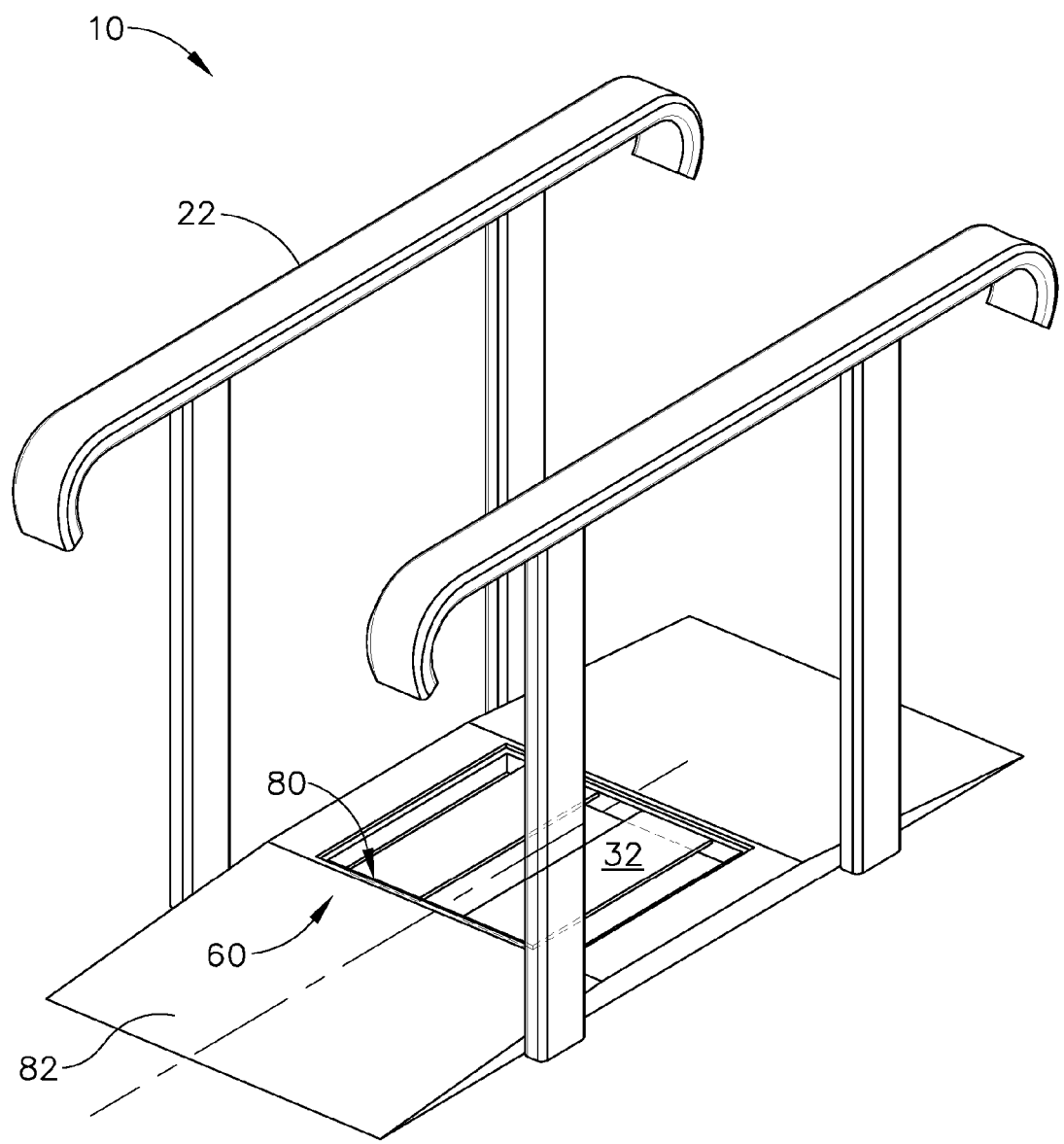
FIG. 6 is a perspective view of the screening system floor that has been modified to accept the screening system shown in FIG. 5.

FIG. 6 is a perspective view of screening system 10 including QR system 60. In the exemplary embodiment, system 60 includes an inductive sensor 32 that in the exemplary embodiment, is positioned beneath floor 30. In accordance with this embodiment, inductive sensor 32 may be positioned within a recessed region 80 of floor 30, between an entrance ramp 82 and an optional exit ramp. This recessed region 80 may also be referred to as the sensor housing. In FIG. 6, the inductive sensor 32 has been omitted to show sensor housing 80, which is recessed within floor 30 of screening system 60.

Figure 7:
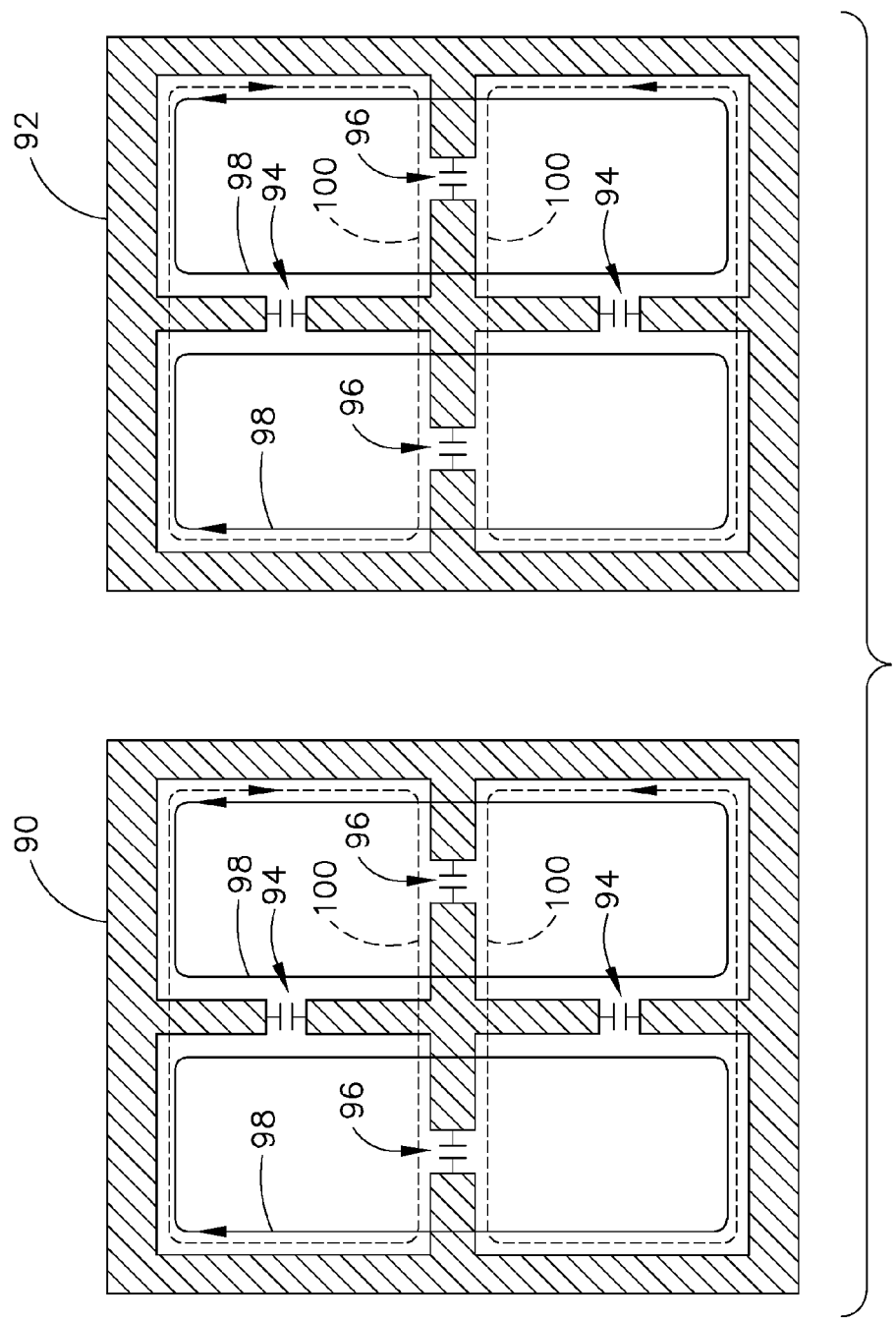
FIG. 7 is a schematic illustration of an exemplary QR induction coil.

As shown in FIG. 7, and in the exemplary embodiment, inductive sensor 32 may be implemented using a first coil 90 and a second coil 92 which allow the QR imaging system 60 to scan a passenger at least two frequencies without switching capacitance into and out of coils 90. Coil 90 is positioned to the left side of floor 30 and may be referred to as the left-side coil which is utilized to scan the passenger's left shoe and lower extremities, and coil 92 may be referred to as the right-side coil which is utilized to scan the passenger's right shoe and lower extremities.

In the exemplary embodiment, each of coils 90 and 92 are dual resonant gradiometer coils that may be utilized for either QR excitation and QR detection. More specifically, each of coils 90 and 92 include a first pair of capacitors 94 having a first capacitance and a second pair of capacitors 96 having a second capacitance that is different than the first capacitance. In the exemplary embodiment, each capacitor 94 has a predetermined capacitance that is sized such that during the first mode of operation, coils 90 and 92 generate a resonance frequency that is approximately equal to the quadrupole magnetic resonance frequency of the first material that is to be detected by system 10. Moreover, ach capacitor 96 has a predetermined capacitance that is sized such that during the second mode of operation, coils 90 and 92 generate a resonance frequency that is approximately equal to the quadrupole magnetic resonance frequency of the second material that is to be detected by system 10.

During operation, coils 90 and 92 are each operable at a plurality of frequencies. In the exemplary embodiment described herein, coils 90 and 92 are operable at a first frequency and a second frequency that is different than the first frequency. More specifically, during operation, the capacitance values of both first and second pairs 94 and 96, respectively, are adjusted to create a double resonance indicated by the two sets of current paths wherein each current path pair represents the current for a given resonant mode of the circuit. For example, the first pair of capacitors 94 may be adjusted to generate a first pair of current paths 98 that are substantially parallel to each other. Moreover, the second pair of capacitors 96 may be adjusted to generate a second pair of current paths 100 that are each perpendicular to the first pair of current paths 96. The current paths 98 and 100 may be placed in communication with an electrical source (not shown in this figure). During operation, current flow through the first pair of current paths 100 in a substantially anti-symmetric manner. That is the current flows through a first current path in a first direction and flows through a second current path in a second opposite direction. Moreover, the current flow through the second current path 100 in an anti-symmetric pattern. The term "anti-symmetric current flow" may be used to refer to the condition in which current flows through the current branches in substantially opposite directions.

Operation of QR screening system 60 in accordance with embodiments of the invention may proceed as follows. First, a person may be directed to enter screening system 10 at entrance ramp 82. The person proceeds up entrance ramp 82 and stands with their left foot positioned of coil 90 and their right foot positioned over coil 92. System 10 may include a visual or audio device to prompt the passenger to facilitate enabling their feet to be properly positioned. Optionally, labels are attached to the floor 30 to indicate where the passenger's feet should be placed.

The scan may be initiated automatically when the passenger stands on the sensor housing or may be initiated by security personnel. At this point, the lower extremities and specifically the shoes of the passenger are scanned using the inductive sensor 32 to determine the presence of a target substance such as, for example, an explosive, contraband, an illegal drug, a controlled substance, or a conductive object. In the case of QR detectable objects, this may be accomplished by a QR sensor providing RF excitation signals at a first frequency generally corresponding to a first predetermined, characteristic NQR frequency of a first target substance. Note that the excitation frequency need not be exactly the same as the target substance NQR frequency, but it is typically within about 500-1000 Hz. The resonant frequencies of the various target substances that may be detected using NQR are well known and need not be further described.

Moreover, the passenger may be scanned at a second frequency, generally corresponding to a second predetermined, characteristic NQR frequency of a second target substance. After the threat screening is completed, system 10 will direct the passenger to exit the screening system 10.

Detection of QR explosives or anomalous metal content will result in an alarm that is conveyed to the security personnel. The QR alarm may be a simple pass/fail indicator or an indication of the explosive type and quantity. The anomalous metal alarm may be a simple pass/fail indicator, an indication of metal imbalance between shoes, or an image of the metal in the soles of the shoes. Moreover, because system 10 includes two coils 90 and 92 functioning as gradiometers, system 10 is configured to differentiate and identify which specific shoe may contain the suspect material.

Described herein is an exemplary passenger screening system. The screening system includes an explosives detection system that is configured to detect the presence of explosives that may be concealed in a passengers shoes or on their lower extremities. The explosive detection system facilitates reliable detection of explosives in shoes and the lower leg area which will allow for rapid screening of passengers entering secure areas (e.g. airport screening).

Specifically, electromagnetic induction methods can be used to detect the presence of metal in both shoes. As with a metal detector used for landmine detection, EMI detectors at both feet can measure attributes related to the rough size, geometry and type of metal (ferromagnetic or not) in each shoe. The characterization can be used to compare the metal signatures of the left and right shoes and will allow for discrimination between simple shoe shanks and potential weapons.

During operation, a passenger scanning process may be initiated automatically when the passenger stands on the sensor housing. Optionally, the passenger scanning process may be initiated manually by a security person, for example. If system 10 detects explosives and/or anomalous metal content within the passengers' shoes, an alarm is conveyed to the security personnel. The alarm may be a simple pass/fail indicator or an indication of the explosive type and quantity. The anomalous metal alarm may be a simple pass/fail indicator, an indication of metal imbalance between shoes, or an image of the metal in the soles of the shoes (provided an MR sensor array is used).

Moreover, further reduction of RH can be achieved using adaptive noise cancellation. In adaptive noise cancellation, the background RH is detected using a set of reference antennas. The signal from the reference antennas is used to remove any RFI signals detected on the QR receiver.

Optionally, system 10 may include magnetoresistive sensors to measure magnetic field gradients created by the presence of metal in shoes. During operation, gradients in both the earth's magnetic field and induced magnetic fields (static or alternating) are measured to discriminate between ferromagnetic and non-ferromagnetic metals. The magnetic field gradients are then mapped to generate an image of metal objects in the shoe allowing an operator to discriminate between simple shoe shanks and potential weapons.

While the invention has been described in terms of various specific embodiments, those skilled in the art will recognize that the invention can be practiced with modification within the spirit and scope of the claims.

What is claimed is:

1. A passenger screening system, comprising:
a floor having a top surface; an inductive sensor positioned under the top surface of the floor, the inductive sensor comprising: a first gradiometer configured to generate a first pair of opposing current paths and a second pair of opposing current paths substantially perpendicular to the first pair of current paths; and a second gradiometer disposed adjacent said first gradiometer and configured to generate a third pair of opposing current paths and a fourth pair of opposing current paths substantially perpendicular to the third pair of current paths, said first and second gradiometers each configured to operate at a first frequency associated with a first target substance and at a second frequency associated with a second target substance to facilitate detecting a presence of at least one of the first target substance and the second target substance wherein the first and second pairs of current paths cooperate to generate four distinct combinations of magnetic fields for detection of the presence of said at least one the first and second target substances.

2. A passenger screening system in accordance with claim 1, wherein said first and second gradiometers each comprise: a first pair of capacitors having a first capacitance, said first pair of capacitors configured to generate the first pair of current paths or the third pair of current paths; and a second pair of capacitors having a second capacitance, said second pair of capacitors configured to generate the second pair of current paths or the fourth pair of current paths.

3. A passenger screening system in accordance with claim 2, wherein said first capacitance is selected such that during a first mode of operation said first and second gradiometers generate a resonance frequency that is approximately equal to a quadrupole magnetic resonance frequency of the first target substance, and said second capacitance is selected such that during a second mode of operation said first and second gradiometers generate a resonance frequency that is approximately equal to a quadrupole magnetic resonance frequency of the second target substance.

4. A passenger screening system in accordance with claim 2, wherein said first capacitance and said second capacitance are each selected such that each of said first and second gradiometers generate a double resonance during operation.

5. A passenger screening system in accordance with claim 1, wherein said first and second pair of current paths each form a first order gradiometer.

6. A passenger screening system in accordance with claim 1, wherein current paths of said first pair of current paths having anti-symmetric current flow and current paths of said second pair of current paths have anti-symmetric current flow.

7. A passenger screening system in accordance with claim 1, further comprising an electrical source configured to provide electrical excitation to said first and second gradiometers causing a first current to flow through at least a first current path in each of said first and second gradiometers in a first direction such that a first magnetic field is formed, and causing a second current to flow through at least a second current path in each of said first and second gradiometers in a second direction opposite the first direction such that a second magnetic field is formed.

8. A passenger screening system in accordance with claim 1, further comprising a radio frequency (RF) subsystem comprising a variable frequency RF source in communication with said inductive sensor and configured to provide RF excitation signals at frequencies generally corresponding to a characteristic nuclear quadrupolar resonant (NQR) frequency of the first target substance and the second target substance, said RF excitation signals being applied to a specimen, and said inductive sensor functioning as a pickup coil for NQR signals from the specimen and providing an NQR output signal.

9. A passenger screening system in accordance with claim 1, wherein said first and second gradiometers each provide electrical excitation to a specimen positioned within said passenger screening system, wherein said electrical excitation causes a response indicative of the presence of at least one of the first target substance and the second target substance.

10. A passenger screening system in accordance with claim 1, further comprising a communication means configured to transmit at least one of a visual indication and an audio indication when the presence of at least one of the first target substance and the second target substance has been detected.

11. A method for operating a passenger screening system, said method comprising:
    operating a first gradiometer to detect a presence of at least one of a first target substance and a second target in a first shoe, the first gradiometer configured to generate a first pair of opposing current paths and a second pair of opposing current paths substantially perpendicular to the first pair of current paths; and operating a second gradiometer to detect the presence of the at least one of the first target substance and the second target substance in a second shoe, the second gradiometer configured to generate a third pair of opposing current paths and a fourth pair of opposing current paths substantially perpendicular to the third pair of current paths, wherein the first and second gradiometers are each configured to operate at a first frequency associated with the first target substance and a second frequency associated with the second target substance to facilitate detecting the presence of the at least one of the first target substance and the second target substance wherein the first and second pairs of current paths cooperate to generate four distinct combinations of magnetic fields for detection of the presence of said at least one the first and second target substances.

12. A method in accordance with claim 11, wherein the first and second gradiometers each include a first pair of capacitors having a first capacitance and a second pair of capacitors having a second capacitance, said method further comprising operating the passenger screening system such that the first and second gradiometers each generate a double resonance.

13. A method in accordance with claim 12 further comprising:
    selecting the first capacitance of the first pair of capacitors such that the passenger screening system generates a resonance frequency that is approximately equal to a quadrupole magnetic resonance frequency of the first target substance; and
    selecting the second capacitance of the second pair of capacitors such that the passenger screening system generates a resonance frequency that is approximately equal to a quadrupole magnetic resonance frequency of the second target substance.

14. A method in accordance with claim 11, further comprising:
    operating the first gradiometer such that current flows through a first current path of each pair of current paths in a first direction; and operating the first gradiometer such that current flows through a second current path of each pair of current paths in a second direction opposite to the first direction.

15. A method in accordance with claim 11, further comprising automatically prompting a passenger to enter the passenger screening system.

16. A method in accordance with claim 11, further comprising manually prompting a passenger to enter the passenger screening system.

17. A method in accordance with claim 11, further comprising automatically prompting a passenger to position a first foot over the first gradiometer and to position a second foot over the second gradiometer.

18. A method in accordance with claim 11, further comprising:
    directing a first current through at least a first current path in each of the first and second gradiometers in a first direction such that a first magnetic field is formed; and
    directing a second current through at least a second current path in each of the first and second gradiometers in a second direction opposite the first direction such that a second magnetic field is formed.

19. A method in accordance with claim 11, further comprising generating at least one of a visual indication and an audio indication when the presence of the at least one of the first target substance and the second target substance has been detected.

20. A method in accordance with claim 12, further comprising:
    generating the first pair of current paths and the third pair of current paths using the first pair of capacitors of each gradiometer; and
    generating the second pair of current paths and the fourth pair of current paths using the second pair of capacitors of each gradiometer.

* * * * *